(12) United States Patent
Yamaoka (10) Patent No.: US 11,731,646 B2
(45) Date of Patent: Aug. 22, 2023

(54) DISPLAY CONTROL DEVICE (71) Applicant: TOYOTA JIDOSHA KABUSHIKI KAISHA, Toyota (JP)

(72) Inventor: Masaaki Yamaoka, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 51 days.

(21) Appl. No.: 17/215,018

(22) Filed: Mar. 29, 2021

(65) Prior Publication Data

US 2021/0323569 A1 Oct. 21, 2021

(30) Foreign Application Priority Data

Apr. 16, 2020 (JP) .................................. 2020-073650

(51) Int. Cl.
*B60W 50/14* (2020.01)
*G06T 11/00* (2006.01)
*B60W 60/00* (2020.01)
*B60W 50/00* (2006.01)

(52) U.S. Cl.
CPC ........ *B60W 50/14* (2013.01); *B60W 50/0097* (2013.01); *B60W 60/001* (2020.02); *G06T 11/00* (2013.01); *B60W 2050/146* (2013.01); *B60W 2540/10* (2013.01); *B60W 2554/80* (2020.02)

(58) Field of Classification Search
None
See application file for complete search history.

(56) References Cited

U.S. PATENT DOCUMENTS

| 11,320,292 B2* | 5/2022 | Okuji ..................... B60K 35/00 |
| 2002/0062189 A1 | 5/2002 | Kannonji |
| 2009/0251304 A1* | 10/2009 | Saito ..................... F02B 77/084 |
| | | 340/441 |
| 2009/0288636 A1 | 11/2009 | Saito et al. |

(Continued)

FOREIGN PATENT DOCUMENTS

| JP | 2002-163798 A | 6/2002 |
| JP | 2005-053401 A | 3/2005 |

(Continued)

OTHER PUBLICATIONS

Dec. 30, 2022 Office Action Issued In U.S. Appl. No. 17/191,360.

(Continued)

*Primary Examiner* — Hunter B Lonsberry
*Assistant Examiner* — Paysun Wu
(74) *Attorney, Agent, or Firm* — Oliff PLC (57) ABSTRACT

A display control device has a depression acquisition part acquiring a current amount of accelerator depression; a suitable value calculation part calculating an amount of accelerator depression required for making a following distance between a preceding vehicle and an ego vehicle a predetermined target following distance, as a suitable depression amount, based on the following distance; and a display control part displaying the current amount of accelerator depression and the suitable depression amount at a display device able to be viewed by a driver. The display control part is configured so as not to change a display position of the display of the suitable depression amount, even if the following distance changes and thus the suitable depression amount changes.

6 Claims, 9 Drawing Sheets

(56) References Cited

U.S. PATENT DOCUMENTS

| | | |
|---|---|---|
| 2011/0015819 A1 | 1/2011 | Goto et al. |
| 2016/0251015 A1 | 9/2016 | Sakaguchi |
| 2017/0253240 A1 | 9/2017 | Kishida |
| 2021/0323569 A1 | 10/2021 | Yamaoka |

FOREIGN PATENT DOCUMENTS

| | | |
|---|---|---|
| JP | 2006-163501 A | 6/2006 |
| JP | 2008-174150 A | 7/2008 |
| JP | 2008-265407 A | 11/2008 |
| JP | 2012-018566 A | 1/2012 |
| JP | 2014-240233 A | 12/2014 |
| JP | 2016-159708 A | 9/2016 |
| JP | 2017-154657 A | 9/2017 |
| JP | 2018-203180 A | 12/2018 |

OTHER PUBLICATIONS

U.S. Appl. No. 17/191,360, filed Mar. 3, 2021 in the name of Masaaki Yamaoka et al.
May 2, 2023 Notice Of Allowance issued in U.S. Appl. No. 17/191,360.

* cited by examiner

DISPLAY CONTROL DEVICE

FIELD

The present disclosure relates to a display control device.

BACKGROUND

In the past, a display control device has been proposed which displays information relating to a following distance between a preceding vehicle and an ego vehicle, on a display able to be viewed by the driver (for example, PTLs 1 to 6).

For example, in PTL 1, a liquid crystal display shows an indicator moving in accordance with a current amount of accelerator depression and a reference range of amount of accelerator depression. This reference range is set centered about an amount of accelerator depression at any point of time when a distance between the preceding vehicle and ego vehicle was constant over a certain extent of time. The mode of display of the index and reference range is changed if this parameter deviates from this reference range.

CITATIONS LIST

Patent Literature

[PTL 1] Japanese Unexamined Patent Publication No. 2002-163798
[PTL 2] Japanese Unexamined Patent Publication No. 2012-18566
[PTL 3] Japanese Unexamined Patent Publication No. 2017-154657
[PTL 4] Japanese Unexamined Patent Publication No. 2016-159708
[PTL 5] Japanese Unexamined Patent Publication No. 2005-53401
[PTL 6] Japanese Unexamined Patent Publication No. 2008-265407

SUMMARY

In this regard, in PTL 1, the reference range is set centered about an amount of accelerator depression at any point of time. Therefore, in the case where the speed of the preceding vehicle changes, the reference range which is displayed will not necessarily be a suitable range in relationship with the preceding vehicle. To set the reference range to a suitable range in relationship with the preceding vehicle, it may be considered to set the reference range based on a following distance between the preceding vehicle and the ego vehicle.

However, in the case of setting the reference range based on the following distance, if the speed of the preceding vehicle frequently changes, the following distance between the preceding vehicle and the ego vehicle will frequently change and, along with this, the reference range will frequently change. If in this way the reference range frequently changes due to the preceding vehicle, it will be hard for the driver to obtain a grasp of the suitable amount of accelerator depression and accordingly the driver may no longer be able to suitably operate the accelerator pedal.

In consideration of the above issue, an object of the present disclosure is to provide a display control device enabling a driver to obtain a grasp of a suitable amount of accelerator depression even in a case where a following distance between a preceding vehicle and an ego vehicle frequently changes.

The present disclosure has the following gist.

(1) A display control device comprising:
a depression acquisition part acquiring a current amount of accelerator depression;
a suitable value calculation part calculating an amount of accelerator depression or a range of the amount of accelerator depression required for making a following distance between a preceding vehicle and an ego vehicle a predetermined target following distance, as a suitable depression amount or a range of the suitable depression amount, based on the following distance; and
a display control part displaying the current amount of accelerator depression and the suitable depression amount or the range of the suitable depression amount at a display device able to be viewed by a driver, wherein
the display control part is configured so as not to change a display position of the display of the suitable depression amount or the range of the suitable depression amount, even if the following distance changes and thus the suitable depression amount or the range of the suitable depression amount changes.

(2) The display control device according to above (1), wherein even if the following distance changes and thus the suitable depression amount or the range of the suitable depression amount changes, the display control part changes intervals between graduations positioned between the display of the current amount of accelerator depression and the display of the suitable depression amount or the range of the suitable depression amount, without changing the display position of the display of the suitable depression amount or the display of the range of the suitable depression amount.

(3) The display control device according to above (1) or (2), wherein the display control part is configured to change the display position of the display of the suitable depression amount or the display of the range of the suitable depression amount, in the case where the following distance changes from any point of time and thus the suitable depression amount or the range of the suitable depression amount changes by equal to or greater than a reference value.

(4) The display control device according to above (3), wherein in the case where it is predicted that an increase or decrease of speed of the preceding vehicle will be maintained over a predetermined time period, the display control part is configured to change the display position of the display of the suitable depression amount or the range of the suitable depression amount, even if the suitable depression amount or the range of the suitable depression amount only changes by less than the reference value along with the change of the following distance.

(5) The display control device according to above (1) or (2), wherein when the following distance changes and thus the suitable depression amount or the range of the suitable depression amount changes, the display control part is configured to change the display position of the display of the suitable depression amount or the range of the suitable depression amount, in the case where the suitable depression amount or the range of the suitable depression amount changes by equal to or greater than a predetermined reference amount per unit time.

(6) The display control device according to above (5), wherein in the case where it is predicted that an increase or decrease of speed of the preceding vehicle will be maintained over a predetermined time period, the display control part is configured to change the display position of the display of the suitable depression amount or the display of the range of the suitable depression amount, even if the change per unit time of the suitable depression amount or the range of the suitable depression amount is less than the reference value.

DESCRIPTION OF EMBODIMENTS

Below, embodiments will be explained in detail while referring to the drawings. Note that, in the following explanation, similar component elements will be assigned the same reference notations.

Configuration of Display System

Figure 1:
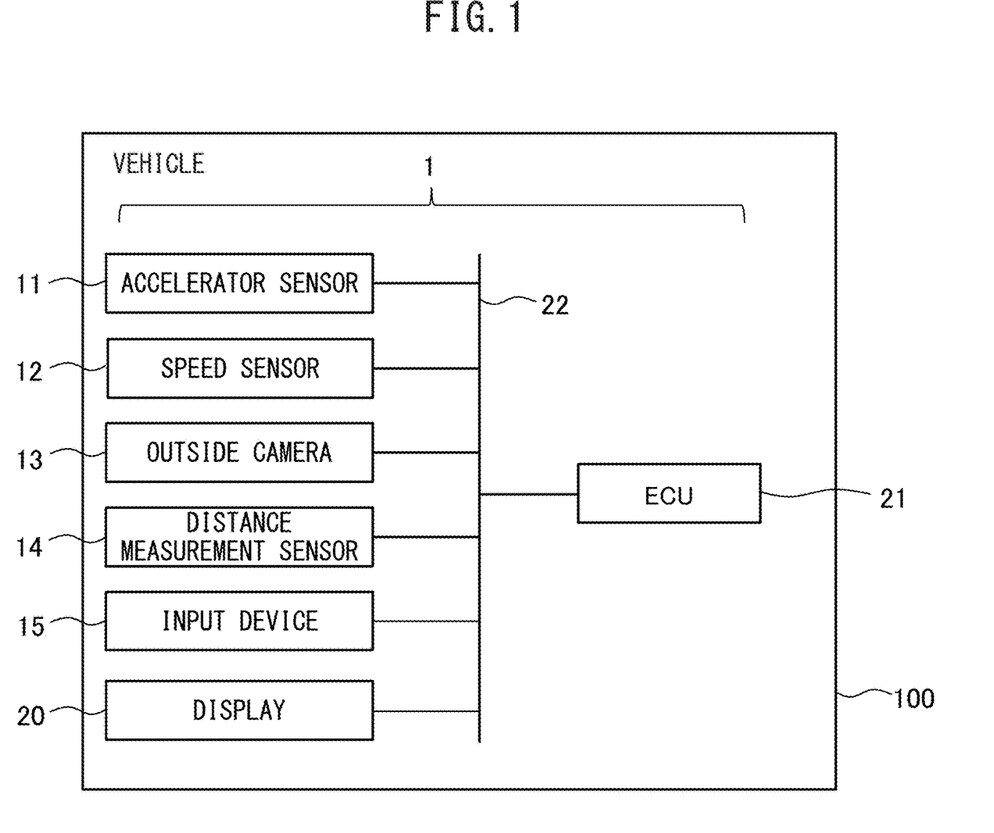
FIG. 1 is a view of the configuration schematically showing a display system.

FIG. 1 is a view of the configuration schematically showing a display system in which a display control device according to one embodiment is mounted. The display system 1 is mounted in a vehicle 100 and displays various information at a display. In the present embodiment, the display system 1 has an accelerator sensor 11, speed sensor 12, outside camera 13, distance measurement sensor 14, input device 15, display 20, and electronic control unit (below, referred to as an "ECU") 21.

However, the display system 1 need not necessarily have all of these. For example, if the display system 1 has the outside camera 13, it need not necessarily have the distance measurement sensor 14.

The accelerator sensor 11, speed sensor 12, outside camera 13, distance measurement sensor 14, input device 15, display 20, and ECU 21 are connected to be able to communicate through an inside network 22. The inside network 22 is a network based on the CAN (Controller Area Network) or other standard.

The accelerator sensor 11 is a sensor detecting an amount of depression by the driver of an accelerator pedal (not shown) of the vehicle 100. The accelerator sensor 11 is attached to the accelerator pedal and outputs a signal corresponding to the amount of depression of the accelerator pedal by the driver (below, referred to as the "amount of accelerator depression"). The output voltage of the accelerator sensor 11 is output to the ECU 21 through the inside network 22.

The speed sensor 12 is a sensor detecting a speed of the vehicle 100. For example, it detects a rotational speed of a drive shaft of the vehicle 100 and detects a speed of the vehicle 100 based on the detected rotational speed. The output signal of the speed sensor 12 is output through the inside network 22 to the ECU 21.

The outside camera 13 is a device capturing an image of the surroundings of the vehicle. The outside camera 13 has 2D detectors (CCD, C-MOS, etc.) configuring an array of photoelectric conversion elements having sensitivity to visible light, and an image-forming optical system forming an image of a region for capture on the 2D detectors. In the present embodiment, the outside camera 13 is for example attached to the inside of the vehicle 100 so as to face the front of the vehicle 100. The outside camera 13 captures an image of the area in front of the vehicle 100 at every predetermined image capturing period (for example 1/30 second to 1/10 second), and generates an image in which the front area is captured. The outside camera 13 outputs a generated image through the inside network 22 to the ECU 21 every time generating an image. Note that, the outside camera 13 may be a single lens camera or a stereo camera. If a stereo camera is used as the outside camera 13, the outside camera 13 functions as the distance measurement sensor 14. The vehicle 100 may also be provided with a plurality of outside cameras different in directions of capture or focal distances.

The distance measurement sensor 14 is a sensor measuring the distance to an object present in the surroundings of the vehicle 100. In the present embodiment, the distance measurement sensor 14 can also measure the orientation of the object present in the surroundings of the vehicle 100. The distance measurement sensor 14 is, for example, a milliwave radar or other radar or LIDAR. Further, the distance measurement sensor 14 may also be configured to measure the relative speed of the object present in the surroundings of the vehicle. In the present embodiment, the distance measurement sensor 14 measures the distance to the object present in front of the vehicle. The distance measurement sensor 14 outputs the results of measurement of the distance to the object in the surroundings to the ECU 21 through the inside network 22, every predetermined period.

The input device 15 is a device receiving input from the driver and other passengers. Specifically, the input device 15 has a touch panel, switches, buttons, and a remote controller. At the input device 15, for example, the setting relating to the upper limit speed of the vehicle 100 and/or the suitable following distance between a preceding vehicle and the ego vehicle is input. The input device 15 outputs the received input through the inside network 22 to the ECU 21. The input device 15, for example, is provided at the instrument panel.

The display 20 is a display device displaying information relating to the vehicle 100 or the operation of the vehicle 100. The display 20, for example, is a liquid crystal display or organic EL display or other device displaying an image on a screen. Alternatively, the display 20 may be a head-up display projecting an image on the front window glass of the vehicle 100 or another transparent plate provided at the front of the driver. Whatever the case, the display 20 may be any type of display so long as able to display an image. The display 20 is connected through the inside network 22 to the ECU 21. The display 20 receives a display signal from the ECU 21, and displays an image corresponding to the received display signal.

Figure 2:
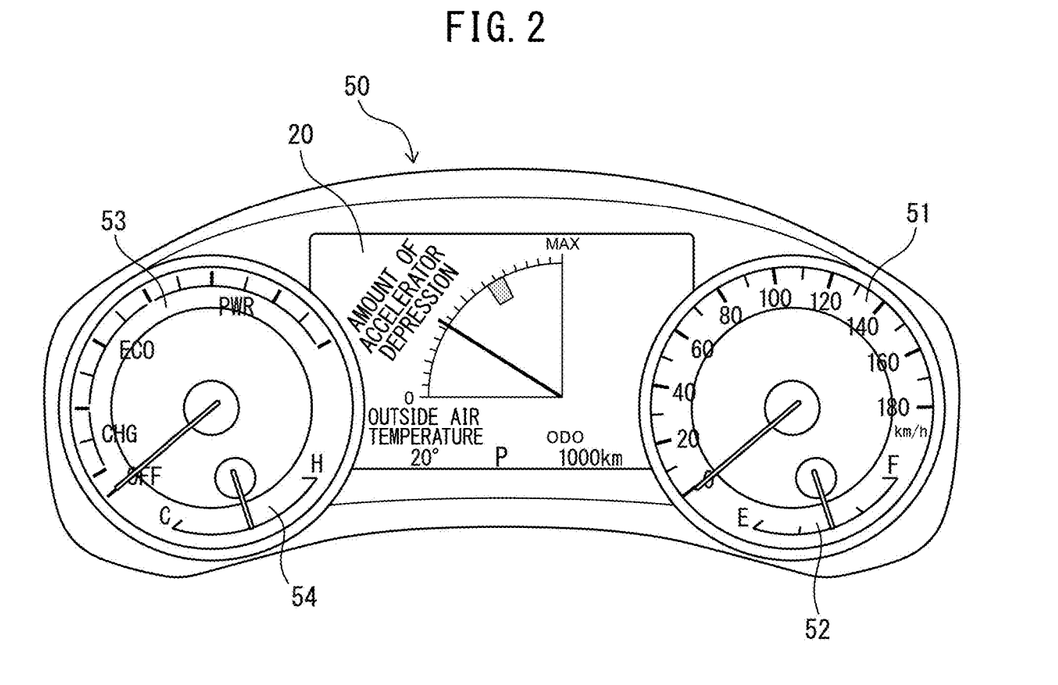
FIG. 2 is a view schematically showing an instrument panel provided inside a vehicle.

FIG. 2 is a view schematically showing an instrument panel 50 provided inside the vehicle 100. The instrument panel 50 shown in FIG. 2 is arranged so as to be positioned at the front of the driver inside the vehicle 100.

As shown in FIG. 2, the instrument panel 50 is provided with a speedometer 51 displaying a speed, a fuel gauge 52 displaying a remaining amount of fuel, a hybrid system indicator 53 showing an output of a hybrid system and a power regeneration level, and a water temperature gauge 54 showing a cooling water temperature of an internal combustion engine. In addition, the instrument panel 50 is provided with a display 20 among these speedometer 51, fuel gauge 52, hybrid system indicator 53, and water temperature gauge 54. At the display 20, various types of warning lights and various other information are displayed in addition to the information relating to the amount of accelerator depression explained later.

Figure 3:
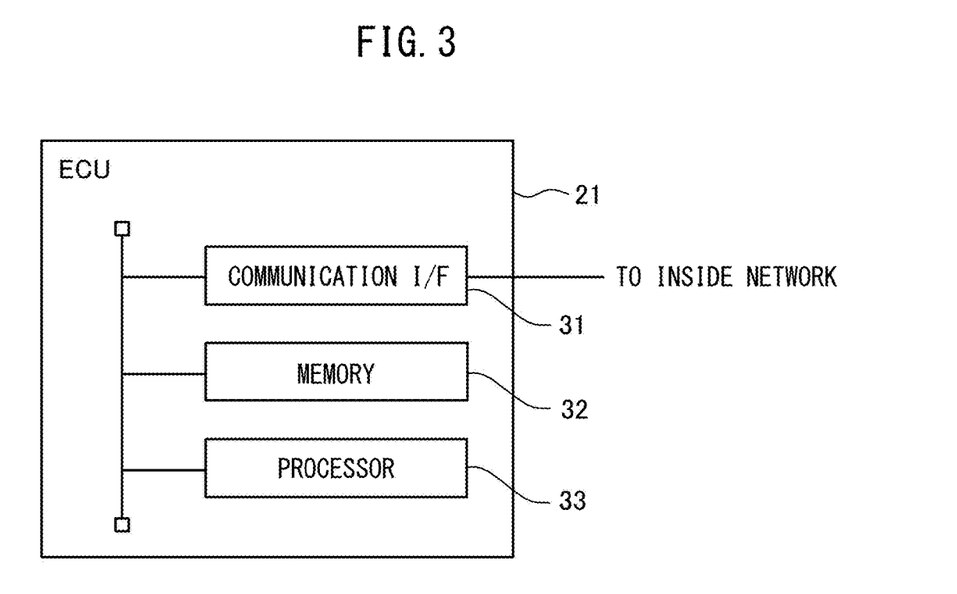
FIG. 3 is a view of a hardware configuration of an ECU 21 of one embodiment of the display control device.

FIG. 3 is a view of the configuration of the ECU 21 of one embodiment of the display control device. The ECU 21 has a communication interface 31, memory 32, and processor 33. Note that, the communication interface 31, memory 32, and processor 33 may be separate circuits or may be configured as a single integrated circuit.

The communication interface 31 has a communication interface circuit and an equipment interface circuit. The communication interface circuit is a circuit for connecting the ECU 21 to an inside network 22. The equipment interface circuit is a circuit for outputting the display signal to the display 20.

The communication interface 31 sends a signal, received from the accelerator sensor 11, corresponding to the amount of depression of the accelerator to the processor 33. Further, the communication interface 31 sends a signal showing the speed of the vehicle 100 received from the speed sensor 12, to the processor 33. In addition, the communication interface 31 sends an image received from the outside camera 13, to the processor 33, each time receiving an image. The communication interface 31 sends the result of measurement of the distance to an object in the surroundings of the vehicle from the distance measurement sensor 14, to the processor 33, each time receiving the results of measurement. In addition, the communication interface 31 sends an input signal of a passenger from the input device 15, to the processor 33, each time receiving that input signal. In addition, the communication interface 31 sends to the display 20 a display signal for the display 20 received from the ECU 21, every time receiving a display signal.

The memory 32 is a storage device storing data. The memory 32, for example, has a volatile semiconductor memory and nonvolatile semiconductor memory. The memory 32 stores a program of driver assistance processing to be performed by the processor 33 of the ECU 21. Further, the memory 32 stores images captured by the outside camera 13, the speed of the vehicle 100, results of measurement of the distance to an object in the surroundings of the vehicle, input information of the passengers, different types of data used in the display processing, etc.

The processor 33 has one or more CPUs (central processing units) and their peripheral circuits. The processor 33 may further have other processing circuits such as logical processing units or numerical processing units. The processor 33 performs processing for display of the display 20 to control the display at the display 20.

Display Operation

Figure 4:
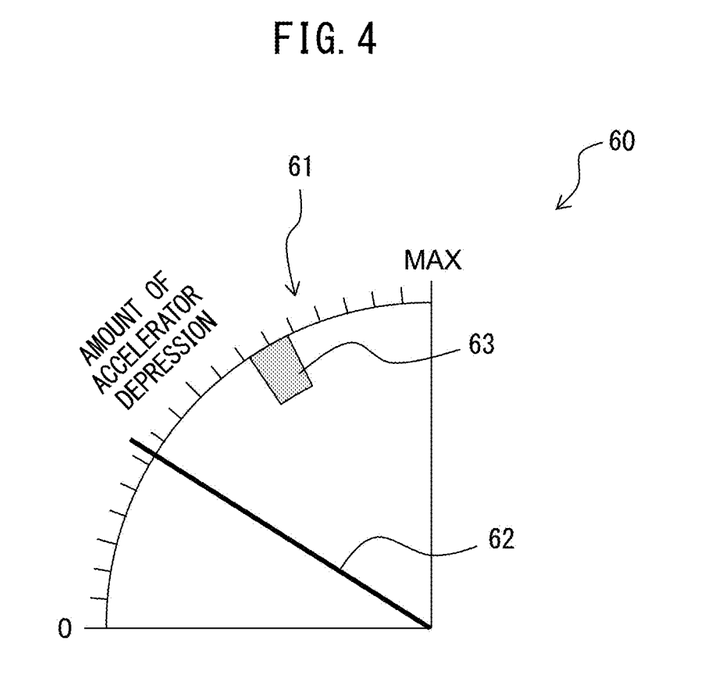
FIG. 4 is a view schematically showing an image displayed at part of the display.

FIG. 4 is a view schematically showing the display shown at part of the display 20. As will be understood from FIG. 4, at the display 20, a display object 60 relating to the amount of accelerator depression is shown. In the present embodiment, the display object 60 is the image shown on the display 20. The display object 60 may be shown on the display 20 at all times when the vehicle 100 is being driven, or may be shown only when selected by the driver.

As shown in FIG. 4, the display object 60 shown at part of the display 20 includes an indicator 61, a needle 62, and a suitable depression range display 63.

The indicator 61 shows an indicator of the amount of accelerator depression. In the example shown in FIG. 4, the indicator 61 has a scale showing the amount of accelerator depression basically at substantially equal intervals along an arc from zero to the maximum value (MAX). However, as explained later, the scale partially changes in interval. The driver can obtain a grasp of the current amount of accelerator depression based on the position of the needle 62 with respect to the indicator 61.

The needle 62 shows the current amount of accelerator depression. In the example shown in FIG. 4, the needle 62 is shown as pivoting about the center of the arc of the indicator 61. In particular, the needle 62 pivots from a position of the indicator 61 facing zero to a position facing MAX. The needle 62 is made to pivot so as to point to the current amount of accelerator depression.

The current amount of accelerator depression is detected by the accelerator sensor 11. Therefore, the needle 62 is made to pivot so as to indicate the amount of accelerator depression detected by the accelerator sensor 11.

The suitable depression range display 63 shows the range of the suitable amount of accelerator depression based on the current running state of the vehicle 100. As shown in FIG. 4, the suitable depression range display 63 is shown as an arc of a length in the circumferential direction shorter than the arc of the indicator 61.

In the present embodiment, the range of the suitable amount of depression corresponding to the suitable depression range display 63 (below, referred to as the "suitable depression range") is specified as a range having a predetermined width containing an suitable amount of accelerator depression (below, referred to as "suitable depression amount") based on the current running state of the vehicle 100. In particular, in the present embodiment, the suitable depression range is set so that the suitable depression amount based on the current running state of the vehicle 100 is a center value of the suitable depression range.

The suitable depression amount, in the present embodiment, is set based on the following distance with a preceding vehicle running in front of the vehicle (ego vehicle) 100 in the same lane as the vehicle 100 and the upper limit speed set by the driver. The upper limit speed is, for example, input by the driver by the input device 15.

In the present embodiment, if the current speed of the vehicle 100 is faster than the upper limit speed, the suitable depression amount is calculated based on the upper limit speed. Specifically, regarding the suitable depression amount, the acceleration (deceleration) giving a speed of the vehicle 100 becoming the upper limit speed after the elapse of a predetermined time (for example, 3 seconds) is calculated. This acceleration is calculated, for example, by dividing the speed difference between the current speed of the vehicle 100 and the upper limit speed by the above predetermined time. Further, the amount of accelerator depression giving the calculated acceleration is calculated as the suitable depression amount. Note that, as long as the current speed of the vehicle 100 is faster than the upper limit speed, the suitable depression amount may be set in any way so long as the speed of the vehicle 100 changes so as to approach the upper limit speed.

On the other hand, if the current speed of the vehicle 100 is equal to or less than the upper limit speed, the suitable depression amount is calculated based on the following distance between the vehicle 100 and a preceding vehicle. Specifically, first, the actual following distance between the vehicle 100 and a preceding vehicle is calculated based on the information of the outside camera 13 or distance measurement sensor 14. In addition, the target following distance is calculated based on the speed of the vehicle 100 or the setting by the driver. Further, the acceleration is calculated so that the difference between the target following distance and the actual following distance becomes zero after the elapse of a predetermined time (for example, 3 seconds). This acceleration "a", for example, is calculated by the following formula (1) assuming the vehicle 100 is being driven at an equal acceleration:

$$a=2\cdot(\Delta D-\Delta V\cdot t)/t^2 \qquad (1)$$

In the formula (1), $\Delta D$ indicates the difference between the target following distance and the actual following distance, $\Delta V$ indicates the speed difference between the vehicle 100 and a preceding vehicle, and "t" indicates the target time until the actual following distance reaches the target following distance (corresponding to the above predetermined time). Note that, if the current speed of the vehicle 100 is equal to or less than the upper limit speed, the suitable depression amount may be set in any way, so long as changing so that the following distance between the vehicle 100 and a preceding vehicle approaches the target following distance.

The target following distance is set based on at least one of the speed of the vehicle 100 and setting by the driver and other parameters. The target following distance is set so as to become longer as the speed of the vehicle 100 becomes faster. In this case, the target following distance may be set so as to change continuously in accordance with the speed of the vehicle 100, or may be set so as to change in steps in accordance with the speed of the vehicle 100. Further, the target following distance is set in stages by the driver (for example, short distance, medium distance, and long distance). For example, if the speed of the vehicle 100 is 80 km/h, when the following distance is set by the driver to a "short distance", the target following distance is set to 25 m, when a "medium distance", the target following distance is set to 33 m, and when a "long distance", the target following distance is set to 47 m. Note that, the target following distance may also be a predetermined constant distance without regard as to the speed of the vehicle 100 and the setting by the driver etc. Note that the target following distance may be a predetermined constant distance regardless of the speed of the vehicle 100 or the setting by the driver.

The width of the suitable depression range is constant in the present embodiment. Therefore, the suitable depression range display 63 moves circumferentially about the pivot center of the needle 62, with the same width.

Note that the width of the suitable depression range may be changed based on at least one of the following distance of the vehicle 100 and a preceding vehicle, the speed difference between the vehicle 100 and a preceding vehicle, and the speed of the vehicle 100. Therefore the width of the suitable depression range is calculated, for example, by finding in advance a table or calculation formula having the following distance with a preceding vehicle, the speed difference with a preceding vehicle, and the speed of the vehicle 100 as arguments, and calculating the width of the suitable depression range based on the table or calculation formula and the values of these parameters at the time of use.

In this case, more specifically, the shorter the following distance between the vehicle 100 and a preceding vehicle, the shorter the width of the suitable depression range is set to. Further, the larger the speed difference between the vehicle 100 and a preceding vehicle, the shorter the width of the suitable depression range is set to. Moreover, when the speed of the vehicle 100 is faster than a predetermined upper reference speed, compared to when the speed of the vehicle 100 is equal to or less than the upper reference speed, the width of the suitable depression range is set narrower. The upper reference speed is, for example, set to a speed slower than the upper limit speed. In addition, when the speed of the vehicle 100 is slower than a predetermined lower reference speed, compared to when it is equal to or greater than the upper reference speed of the vehicle 100, the width of the suitable depression range is set narrower. The lower reference speed is set to a speed slower than the upper reference speed. Further, the larger the suitable depression amount, the broader the width of the suitable depression range is set to.

Note that, the display object 60 relating to the amount of accelerator depression, in the above embodiment, is configured so that the needle 62 pivots inside an arc shaped indicator 61 so as to enable the current amount of accelerator depression, etc., to be grasped by the driver. However, the display object 60, for example, may be configured so that the needle 62 slides straight along a straight shaped indicator 61 so as to enable the current amount of accelerator depression, etc., to be grasped by the driver.

Further, in the above embodiment, the display object 60 relating to the amount of accelerator depression is an image shown on the display 20. However, the display object 60 does not necessarily have to be an image. For example, the needle 62 may be formed as a physical needle, and indicator 61 may be shown on a display disposed below the needle 62. Whatever the case, so long as possible to display the indicator 61, the needle 62 (that is, the current amount of accelerator depression) and suitable depression range display 63, instead of the display 20, any display device able to be viewed by the driver may be used.

Furthermore, in the above embodiment, if the current speed of the vehicle 100 is faster than the upper limit speed, the suitable depression amount is calculated based on the upper limit speed. However, even if the current speed of the vehicle 100 does not reach the upper limit speed, if expected to reach the upper limit speed, the suitable depression amount may be calculated based on the upper limit speed. In particular, when the speed of the vehicle 100 is expected to exceed the preset upper limit speed if the accelerator pedal is depressed by the amount of accelerator depression in the suitable depression range calculated based on the following distance of the vehicle 100 and a preceding vehicle, the suitable depression amount is calculated based on the upper limit speed.

Display of Range of Suitable Depression Amount When Following Distance Changes

As explained above, the suitable depression range display 63 basically is displayed so that its center value is the suitable depression amount. However, in the present embodiment, even in the case where the suitable depression amount and the range of the suitable depression amount change along with a change in the following distance between the preceding vehicle and the ego vehicle, the display position of the suitable depression range display 63 is not changed, depending on the situation.

Figure 5A:
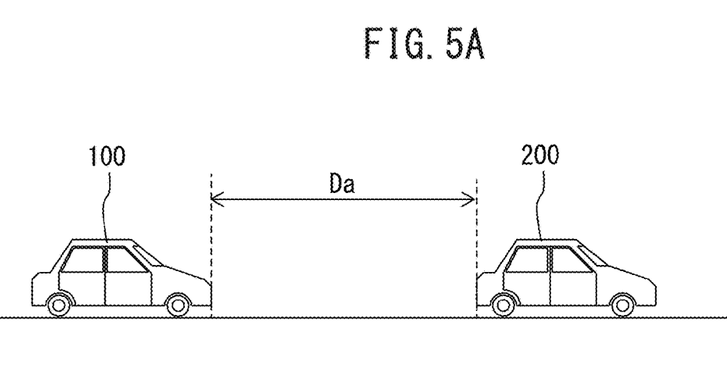
FIGS. 5A to 5C are views showing a positional relationship between an ego vehicle and a preceding vehicle.
Figure 5B:
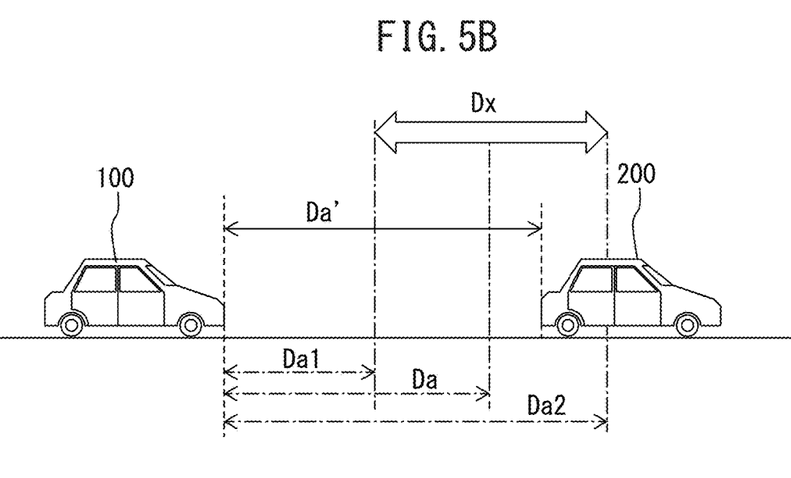
Figure 5C:
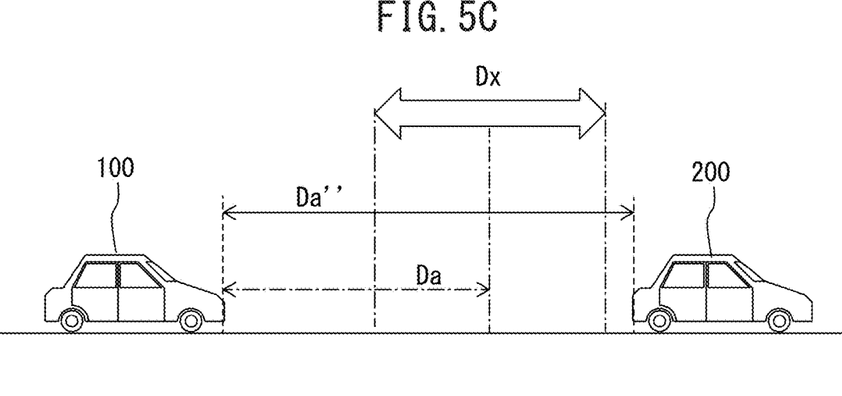

FIGS. 5A to 5C are views showing a positional relationship between the ego vehicle 100 and the preceding vehicle 200. FIG. 5A shows the positional relationship between the ego vehicle and the preceding vehicle 200 at a certain point of time. At this time, the following distance between the ego vehicle 100 and the preceding vehicle 200 is Da. In particular, the following distance Da in FIG. 5A is longer than the target following distance Dt. Accordingly, at this time, the display 20, as shown in FIG. 4, displays the suitable depression range display 63 at the side of a larger amount of depression than the indicator 62.

FIG. 5B shows the positional relationship between the ego vehicle and the preceding vehicle 200 after the elapse of a predetermined time from the point of time shown in FIG. 5A. At the point of time shown in FIG. 5B, compared with the point of time shown in FIG. 5A, the following distance becomes longer (Da').

FIG. 5B shows the following distances Da1 and Da2 corresponding to amounts of depression differing by amounts corresponding to a predetermined reference value with respect to the suitable depression amount at the time of the following distance Da shown in FIG. 5A. Specifically, the following distance Da1 shows the following distance in which the suitable depression amount when assuming the following distance is Da1, will be smaller than the suitable depression amount at the following distance of Da by the reference value. Similarly, the following distance Da2 shows the following distance in which the suitable depression amount when assuming the following distance is Da2, will be larger than the suitable depression amount at the following distance of Da by the reference value. Further, the region between the following distance Da1 and the following distance Da2 is shown as the region Dx.

At the point of time shown in FIG. 5B, compared with the point of time shown in FIG. 5A, the following distance becomes longer, but the following distance Da' at this point of time is a distance within the region Dx based on the following distance Da at a certain point of time in the past shown in FIG. 5A. Therefore, at the point of time shown in FIG. 5B, compared with the point of time shown in FIG. 5A, the suitable depression amount does not greatly change.

Figure 6:
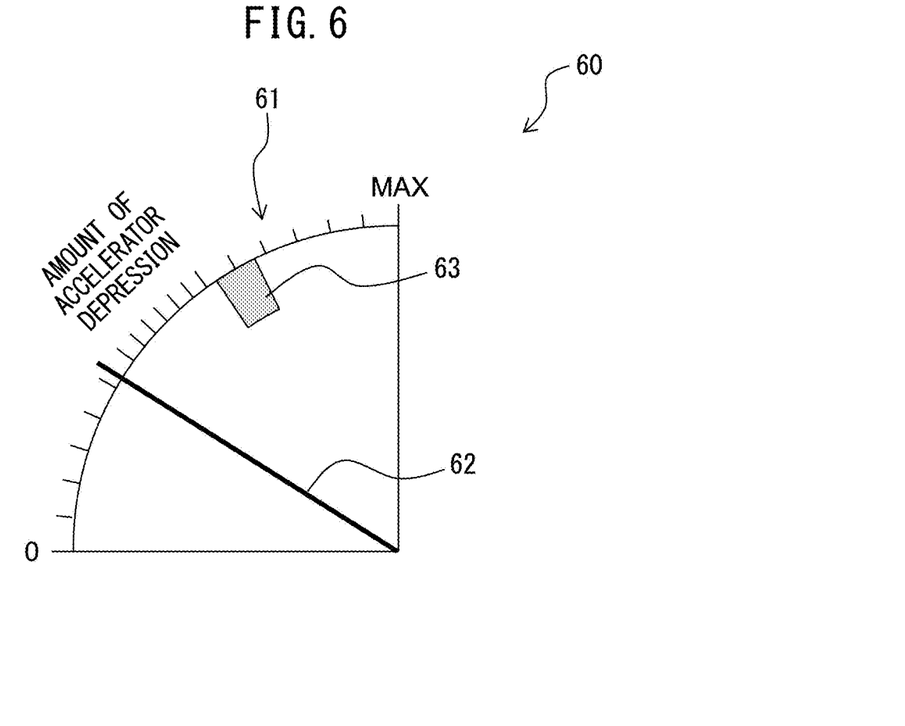
FIG. 6 is a view schematically showing an image displayed at part of the display.

FIG. 6 shows a display object 60 displayed at part of the display 20 at the point of time shown in FIG. 5B. In the state shown in FIG. 6, the display position of the suitable depression range display 63 is the same as the display position of the suitable depression range display 63 shown in FIG. 4. Therefore, in the state shown in FIG. 6, the display position of the suitable depression range display 63 is displayed at a position different from the optimal range of suitable depression amount at this point of time. However, in the present embodiment, the indicator 61 in the state shown in FIG. 6 has been changed from the indicator 61 in the state shown in FIG. 4. Specifically, the interval between graduations becomes shorter in an area between the needle 62 showing the current amount of accelerator depression and the suitable depression range display 63. In the present embodiment, the interval between graduations is adjusted so that the number of the graduations between the needle 62 and the suitable depression range display 63 becomes a number corresponding to the deviation between the current amount of accelerator depression and the suitable depression range.

FIG. 5C shows the positional relationship between the ego vehicle and the preceding vehicle 200 after the elapse of a predetermined time from the point of time shown in FIG. 5B. At the point of time shown in FIG. 5C, compared with the point of time shown in FIG. 5B, the following distance becomes longer (Da").

As will be understood from FIG. 5C, at the point of time shown in FIG. 5C, compared with the point of time shown in FIG. 5B, the following distance is longer. As a result, the following distance Da" at this point of time is a distance outside the region Dx based on the following distance Da at a certain point of time in the past shown in FIG. 5A. Therefore, at the point of time shown in FIG. 5C, compared with the point of time shown in FIG. 5A, the suitable depression amount greatly changes.

Figure 7:
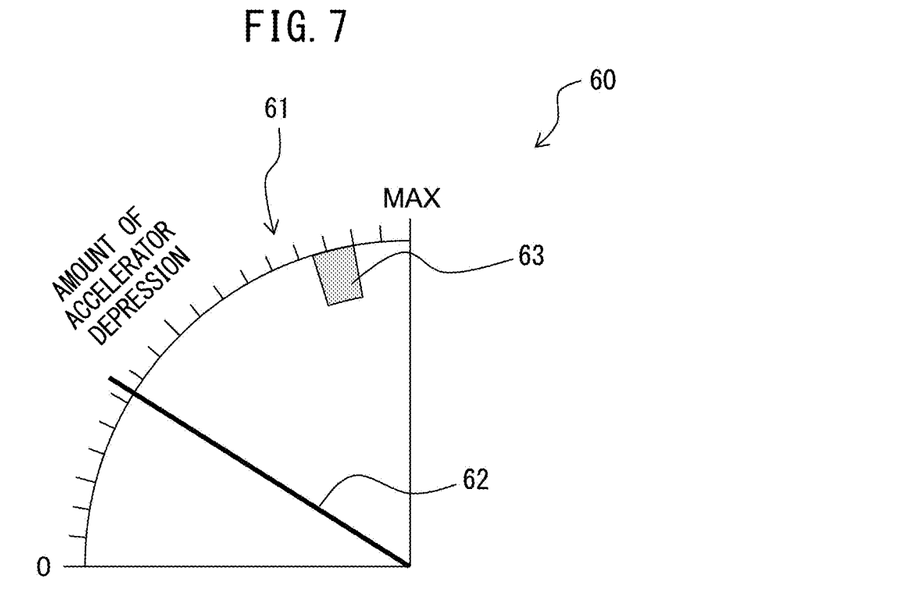
FIG. 7 is a view schematically showing an image displayed at part of the display.

FIG. 7 shows the display object 60 displayed at part of the display 20 at the point of time shown in FIG. 5C. In the state shown in FIG. 7, the display position of the suitable depression range display 63 is shown at a position corresponding to the range of the suitable depression amount calculated at that point of time. Therefore, in the state shown in FIG. 7, the display position of the suitable depression range display 63 is a position different from the display position of the suitable depression range display 63 shown in FIG. 4. In the present embodiment, when the following distance greatly changes from a certain point of time in the past in this way and the range of the suitable depression amount at a point of time after the change greatly changes from the range of the suitable depression amount at the above certain point of time in the past, the display position of the suitable depression range display 63 is changed from the display position of the suitable depression range display 63 at a certain point of time in the past.

Further, in the present embodiment, in the case where it is predicted that the increase or decrease of the speed of the preceding vehicle 200 will be maintained (for example, over several seconds), even if the current following distance is a distance within the region Dx based on the following distance Da at a certain point of time in the past, the suitable depression range display 63 is displayed at a position corresponding to the current range of the suitable depression amount.

Specifically, for example, in the case where the traffic light ahead on the road on which the ego vehicle 100 and the preceding vehicle 200 are running is a red light or in the case where there are congested vehicles ahead, it is judged that the decrease of speed of the preceding vehicle 200 will continue for a predetermined time. Further, in the case of accelerating from the state where the preceding vehicle 200 had stopped at a red light or the state where it had stopped at a toll booth, it is judged that the increase in speed of the preceding vehicle 200 will continue for a predetermined time. Therefore, in such a case, the suitable depression range display 63 is shown at a position corresponding to the current range of the suitable depression amount.

Display Processing

Figure 8:
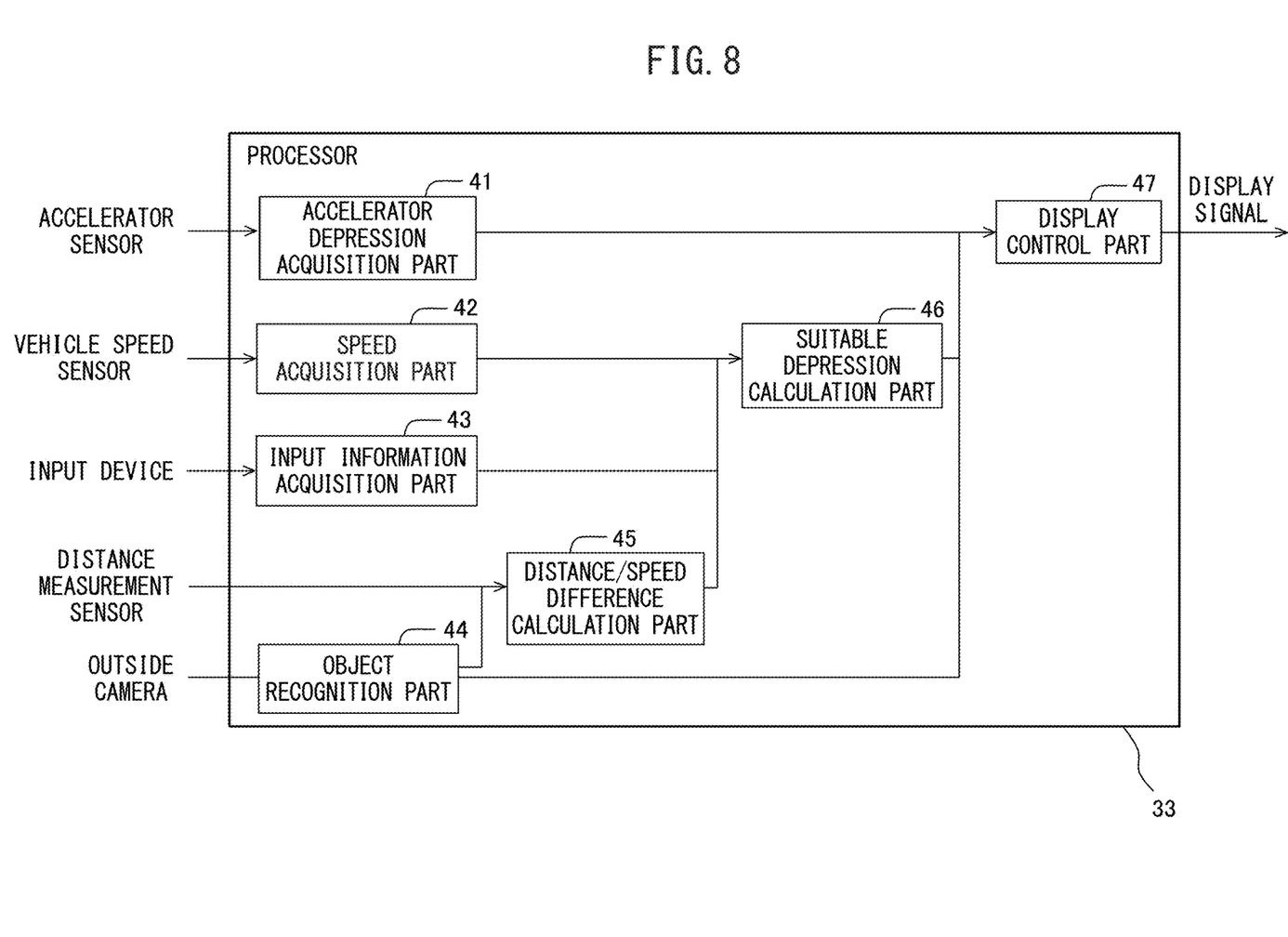
FIG. 8 is a functional block diagram of a processor of an ECU relating to display processing.

FIG. 8 is a functional block diagram of the processor 33 of the ECU 21 relating to display processing. The processor 33 is provided with an accelerator depression acquisition part 41, speed acquisition part 42, input information acquisition part 43, object recognition part 44, distance/speed difference calculation part 45, suitable depression calculation part 46, and display control part 47. These functional blocks of the processor 33, for example, are functional modules realized by a computer program operating on the processor 33. Alternatively, these functional blocks of the processor 33 may be dedicated processing circuits provided at the processor 33.

The accelerator depression acquisition part 41 acquires the current actual amount of accelerator depression from the accelerator sensor 11. The output of the accelerator sensor 11 is continuously input to the accelerator depression acquisition part 41. The accelerator depression acquisition part 41 outputs the acquired current amount of accelerator depression to the display control part 47.

The speed acquisition part 42 acquires the current speed of the vehicle 100 from the speed sensor 12. The output from the speed sensor 12 is continuously input to the speed acquisition part 42. The speed acquisition part 42 outputs the acquired current speed of the vehicle 100 to the suitable depression calculation part 46.

The input information acquisition part 43 acquires information input by the driver or another passenger at the input device 15 (for example, the setting in relation to the upper limit speed of the vehicle 100 and the suitable following distance between the preceding vehicle and the ego vehicle). The output from the input device 15 is input to the input information acquisition part 43, every time there is input at the input device 15. The input information acquisition part 43 outputs the acquired input information to the suitable depression calculation part 46.

The object recognition part 44 recognizes an object in the surroundings of the vehicle 100, in particular another vehicle running in the surroundings of the vehicle 100 and traffic lights. For example, an image captured by the outside camera 13 is input to the object recognition part 44. The object recognition part 44 recognizes another vehicle and traffic lights captured in the input image by image recognition processing. As the image recognition processing, a neural network, support vector machine, or other known pattern recognition method is used. The object recognition part 44 outputs the type of the other vehicle recognized and the position thereof in the image, etc., to the distance/speed difference calculation part 45, and the information of the recognized traffic lights to the display control part 47.

The distance/speed difference calculation part 45 calculates the following distance and the speed difference with a preceding vehicle running in front of the vehicle 100 in the same lane as the vehicle 100. Information on the other vehicle in the surroundings of the vehicle 100 recognized by the object recognition part 44 and the distance to an object in the surroundings of the vehicle 100 measured by the distance measurement sensor 14 are input to the distance/speed difference calculation part 45. The distance/speed difference calculation part 45 calculates the following distance between the vehicle 100 and a preceding vehicle, based on the information of the other vehicle and the distance to an object in the surroundings. In addition, the distance/speed difference calculation part 45 calculates the speed difference of the vehicle 100 and a preceding vehicle, based on the time-series information of the following distance between the vehicle 100 and a preceding vehicle. For example, when a preceding vehicle approaches the vehicle 100, it calculates the speed difference based on the speed by which the preceding vehicle approaches the vehicle 100. The distance/speed difference calculation part 45 outputs the calculated following distance with a preceding vehicle and speed difference with a preceding vehicle, to the suitable depression calculation part 46.

The suitable depression calculation part 46 calculates the suitable depression amount based on the setting by the driver relating to the following distance, the speed of the vehicle 100, the following distance between the vehicle 100 and the preceding vehicle, etc. In particular, when the speed of the vehicle 100 is faster than the upper limit speed, the suitable depression calculation part 46 calculates the amount of accelerator depression required for making the running speed of the vehicle 100 the upper limit speed based on the current speed of the vehicle 100, as the suitable depression amount. Further, when the speed of the vehicle 100 is equal to or less than the upper limit speed, the suitable depression calculation part 46 calculates the amount of accelerator depression required for the following distance with the preceding vehicle to become the target following distance, as the suitable depression amount. Note that, the suitable depression calculation part 46 may also calculate the range of the suitable depression amount, based on the calculated suitable depression amount.

The current speed of the vehicle 100 acquired by the speed acquisition part 42, the input information acquired by the input information acquisition part 43, and the following distance with the preceding vehicle and the speed difference with the preceding vehicle calculated by the distance/speed difference calculating part 45 are input to the suitable depression calculation part 46. In addition, the amount of accelerator depression may also be input from the accelerator depression acquisition part 41 to the suitable depression calculation part 46.

The suitable depression calculation part 46 specifically calculates the suitable depression amount, using the above formula (1), based on the following distance and speed difference calculated by the distance/speed difference calculating part 45 and the setting of the driver relating to the upper limit speed and the target following distance acquired by the input information acquisition part 43. The suitable depression calculation part 46 outputs the calculated suitable depression amount to the display control part 47.

Figure 9:
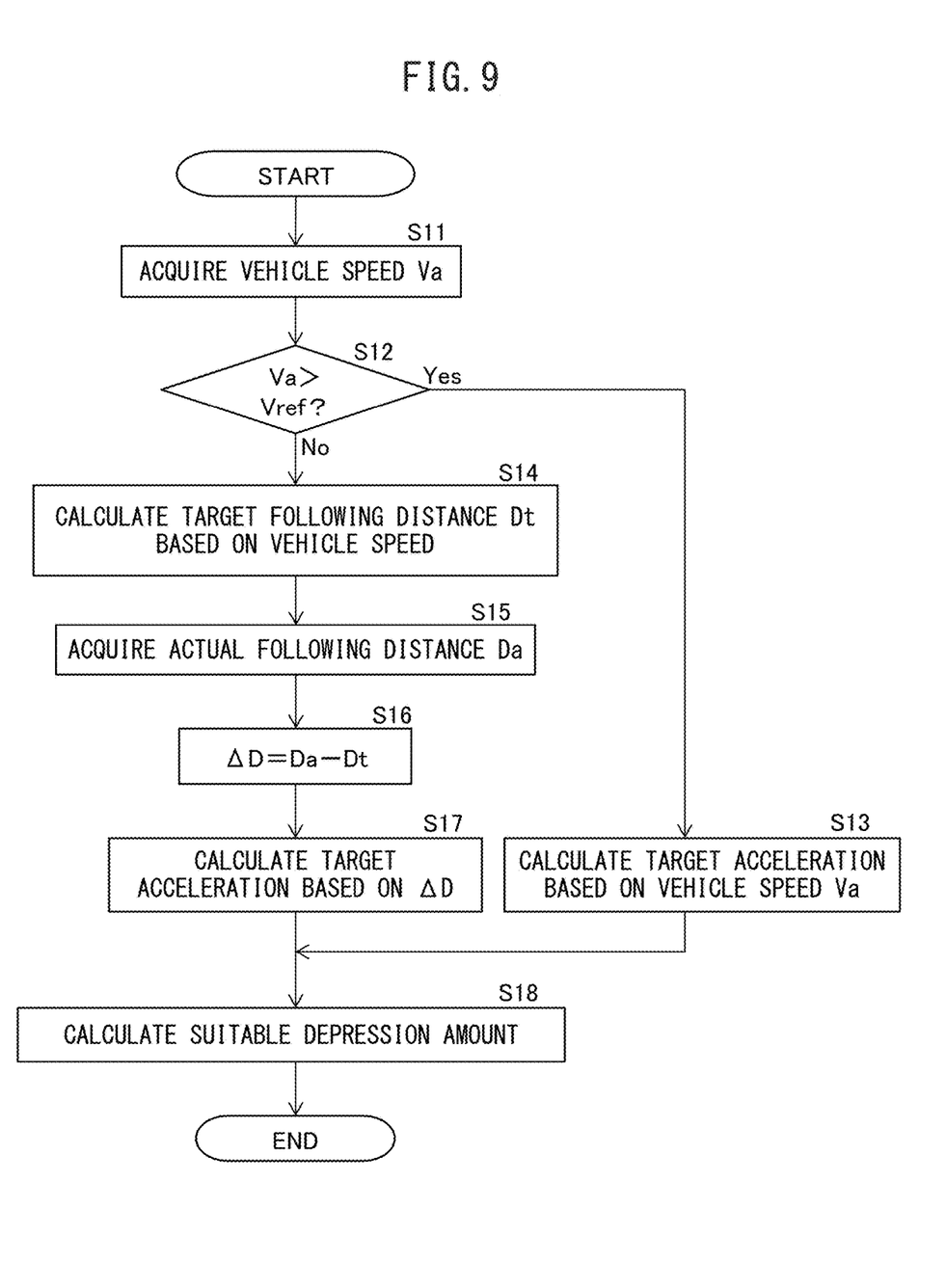
FIG. 9 is a flow chart of processing for calculating a suitable range, performed in a suitable depression calculation part.

FIG. 9 is a flow chart of processing for calculating a suitable depression range performed in the suitable depression calculation part 46. As shown in FIG. 9, in the processing for calculating the optimum amount of depression, the suitable depression calculation part 46 first acquires the speed Va of the vehicle 100 (step S11). Next, the suitable depression calculation part 46 judges if the speed Va of the vehicle 100 acquired at step S11 is faster than the upper limit speed Vref set in advance by the driver (step S12). If at step S12 it is judged that the speed Va of the vehicle 100 is faster than the upper limit speed Vref, the suitable depression calculation part 46 calculates the target acceleration based on the speed Va so that the speed Va becomes the upper limit speed Vref after the elapse of a predetermined time (step S13), and calculates the optimum amount of depression based on the calculated target acceleration (step S18).

On the other hand, if at step S12 it is judged that the speed Va of the vehicle 100 is equal to or less than the upper limit speed Vref, the suitable depression calculation part 46 calculates the target following distance Dt based on the speed Va and the setting of the following distance by the driver (step S14). Next, the suitable depression calculation part 46 acquires the actual following distance Da from the distance/speed difference calculation part 45 (step S15), and calculates the difference ΔD between the target following distance Dt and the actual following distance Da (step S16) (ΔD=Da−Dt). After that, the suitable depression calculation part 46 calculates the target acceleration, based on the difference ΔD of the following distance and the speed difference ΔV between the vehicle 100 and a preceding vehicle, by using the above formula (1) (step S17), and calculates the optimum amount of depression based on the target acceleration (step S18).

The display control part 47 outputs a display signal controlling the display object 60 of the display 20 to make the display 20 show the display object 60. In particular, the display control part 47 makes the display 20 show the needle 62 representing the current amount of accelerator depression and suitable depression range display 63. Information relating to the current amount of accelerator depression is input from the accelerator depression acquisition part 41 to the display control part 47, and information relating to the suitable depression amount is input from the suitable depression calculation part 46. In addition, information relating to the traffic lights is input from the object recognition part 44 to the display control part 47.

The display control part 47 generates a display signal showing the needle 62 on the display so as to indicate the current amount of accelerator depression. In addition, the display control part 47 generates a display signal making a display show the suitable depression range display 63 based on the suitable depression amount calculated at the suitable depression calculation part 46. The generated display signal is input to the display 20. At the display 20, the needle 62 and suitable depression range display 63 are shown in accordance with the display signal from the display control part 47.

In particular, based on the suitable depression amount at any certain point of time, the display control part 47 displays a range of a certain width having the suitable depression amount as the center value, as the suitable depression range display 63. After that, the display control part 47 maintains the display position of the suitable depression range display 63 without changing it while the current suitable depression amount is a value within a preset reference value from the suitable depression amount at the above certain point of time. On the other hand, if the current suitable depression amount deviates from the suitable depression amount at the above certain point of time by equal to or greater than the above reference value, the display control part 47 changes the position of the suitable depression range display 63 and displays a range of a certain width having the current amount of depression as the center value, as the suitable depression range display 63.

Further, in the case where it is predicted that the increase or decrease of the speed of the preceding vehicle 200 will be maintained over a predetermined time period, even if the current suitable depression amount only changes by a value of less than the reference value from the suitable depression amount at a certain point of time in the past, the display control part 47 changes the position of the suitable depression range display 63 and displays a range of a certain width having the current amount of depression as the center value, as the suitable depression range display 63.

Figure 10:
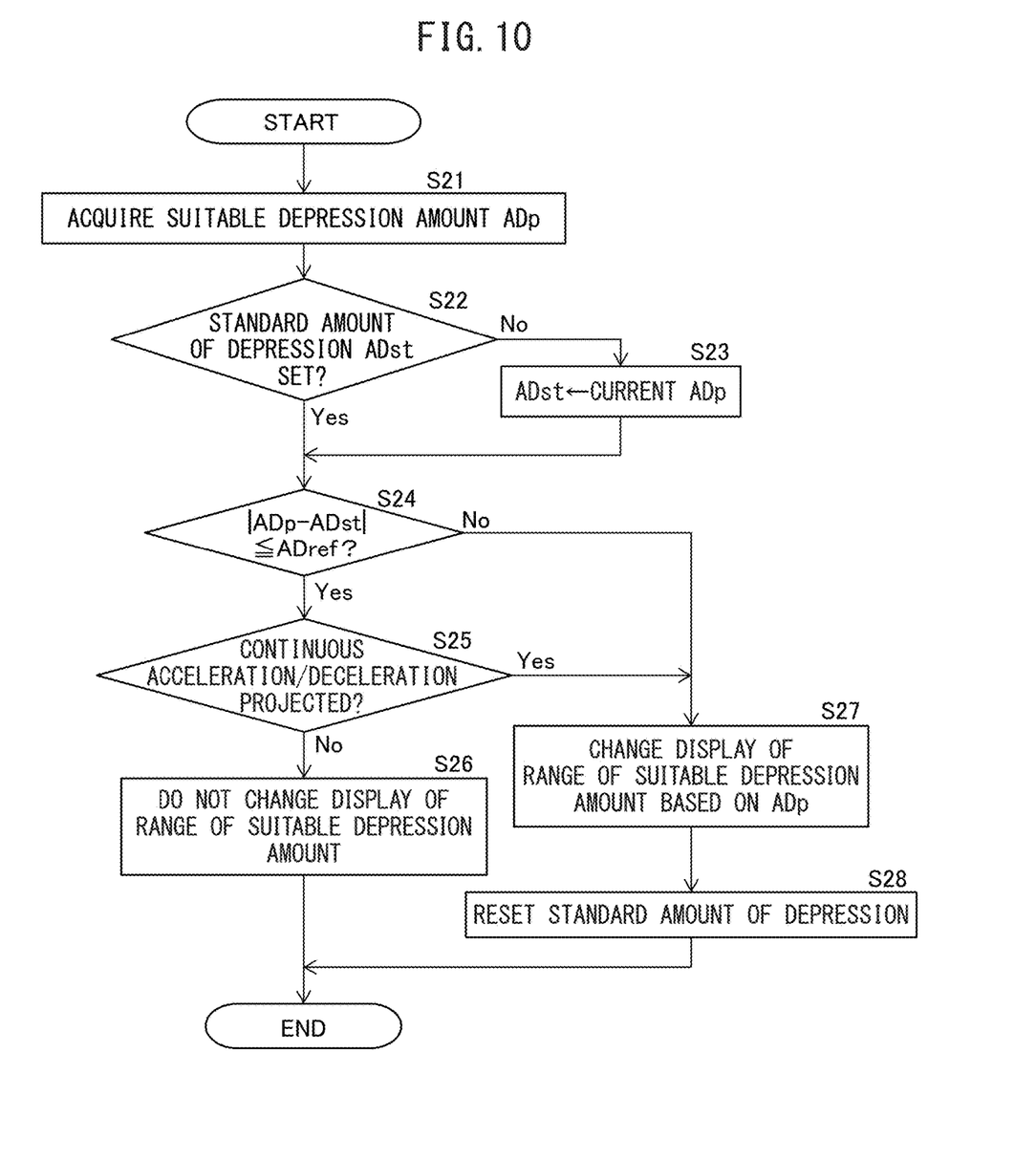
FIG. 10 is a flow chart of display processing performed in a display control part.

FIG. 10 is a flow chart of processing for display performed at the display control part 47. As shown in FIG. 10, in processing for display, the display control part 47 first acquires the calculated suitable depression amount from the suitable depression calculation part 46 (step S21). Next, the display control part 47 judges if the standard amount of depression ADst has been set (step S22). The standard amount of depression ADst indicates the suitable depression amount at a certain point of time in the example shown with reference to FIG. 4 to FIG. 7. If at step S22 it is judged that the standard amount of depression ADst has not been set, the display control part 47 sets the current suitable depression amount ADp calculated based on the current following distance as the standard amount of depression ADst (step S23).

If at step S22 it is judged that the standard amount of depression ADst has been set or if the processing of step S23 has ended, the display control part 47 judges if the difference between the current suitable depression amount ADp and the standard amount of depression ADst is equal to or less than the reference value ADref (step S24). In addition, the display control part 47 judges if it is predicted that the preceding vehicle 200 will continue to accelerate or decelerate (step S25). Specifically, for example, it is judged if the preceding vehicle 200 will accelerate or decelerate over a predetermined time period, based on the color of the traffic light ahead of the preceding vehicle 200 input from the object recognition part 44.

If at step S24 it is judged that the difference between the current suitable depression amount ADp and the standard amount of depression ADst is equal to or less than the reference value ADref and it is judged at step S25 that it is predicted that the preceding vehicle 200 will not continue to accelerate or decelerate, the display control part 47 will continue to display the suitable depression range display 63 without changing it (step S26). On the other hand, if at step S24 it is judged that the difference between the current suitable depression amount ADp and the standard amount of depression Adst is larger than the reference value ADref or it is judged at step S25 that it is predicted that the preceding vehicle 200 will continue to accelerate or decelerate, the display control part 47 sets the suitable depression range display 63 based on the suitable depression amount ADp calculated at step S21 (step S27). After that, the display control part 47 resets the standard amount of depression ADst (step S28).

Advantageous Effects of Invention

In the present embodiment, on the display 20, the needle 62 showing the current amount of accelerator depression and the suitable depression range display 63 corresponding to the following distance with the preceding vehicle are shown. Further, in the case where the current suitable depression amount does not greatly change from the suitable depression amount at a certain point of time in the past, the display position of the suitable depression range display 63 is maintained as it is without being changed. For this reason, even if the following distance with the preceding vehicle 200 is small and changes frequently, the suitable depression range display 63 will not change. As a result, the driver can easily obtain a grasp of the suitable amount of accelerator depression and accordingly can suitably operate the accelerator pedal.

However, if performing such control, if there is a certain trend toward increase or a certain trend toward decrease in the vehicle speed of the preceding vehicle 200, the suitable depression range display 63 changes discretely (intermittently) along with change of the vehicle speed. As opposed to this, if, in the present embodiment, it is predicted that the preceding vehicle 200 will continue to be accelerated or decelerated, the suitable depression range display 63 will be shown based on the current suitable depression amount. Therefore, when there is a certain trend toward increase or a certain trend toward decrease in the preceding vehicle 200, the suitable depression range display 63 will not change discretely, but continuously, and thus the driver will be kept from feeling strange.

<Modifications>

Figure 11:
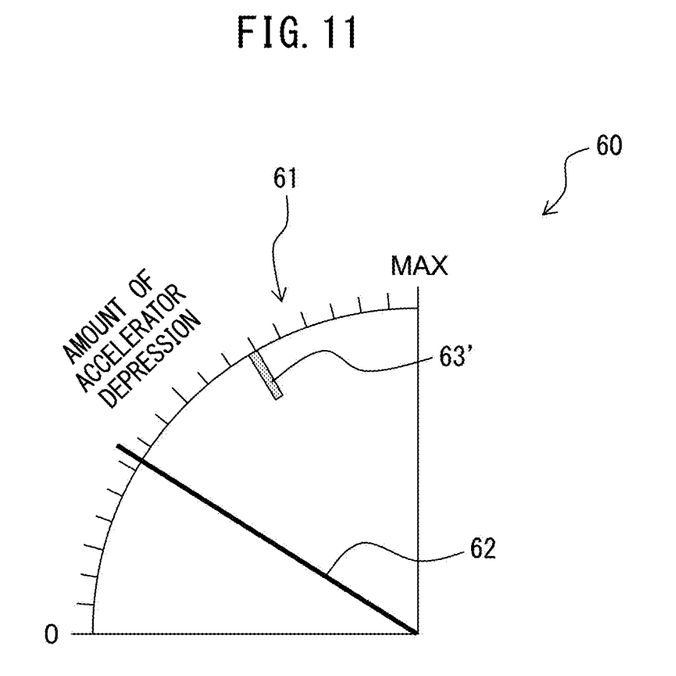
FIG. 11 is a view schematically showing an image displayed at part of the display.

In the above embodiment, on the display 20, the range of the suitable depression amount, that is, the suitable depression range display 63, is shown. However, at the display 20, as shown in FIG. 11, not the range of the suitable depression amount, but the suitable depression amount may be shown as the suitable depression display 63'.

Further, in the above embodiment, it is judged whether to change the display position of the display of the suitable depression amount or the range of the suitable depression amount, based on whether the following distance is changed from any point of time and thus the suitable depression amount or the range of the suitable depression amount is changed by equal to or greater than the reference value.

However, it is also possible to judge whether to change the display position of the display of the suitable depression amount or the range of the suitable depression amount, based on whether the suitable depression amount or the range of the suitable depression amount is changed by equal to or greater than a predetermined reference value per unit time.

Specifically, in the case where the suitable depression amount or the range of the suitable depression amount only changes by less than the predetermined reference distance per unit time, the change of the suitable depression amount is small, therefore the display position of the display of the suitable depression amount or the display of the suitable depression range is not changed. On the other hand, in the case where the suitable depression amount or the range of the suitable depression amount changes by equal to or greater than the predetermined reference distance per unit time, the change of the suitable depression amount is large, therefore the display of the suitable depression amount or the display of the suitable depression range is changed in display position to be shown at a position corresponding to the suitable depression amount at that time.

In addition, in this case, similarly to the above embodiment, in the case where it is predicted that the increase or decrease of speed of the preceding vehicle 200 will be maintained over a predetermined time period, even if the change per unit time of the suitable depression amount or the range of the suitable depression amount is less than the reference amount, the display position of the display of the suitable depression amount or the display of the range of the suitable depression amount is changed.

Further, in the above embodiment, the range of the suitable depression amount is calculated as a range centered about the calculated suitable depression amount and extending by the width of the calculated range of the suitable depression amount. However, the range of the suitable depression amount need not be a range centered about the calculated suitable depression amount.

Above, preferred embodiments according to the present invention were explained, but the present invention is not limited to these embodiments and can be corrected and changed in various ways within the language of the claims.

The invention claimed is:

1. A display control device having a processor, the processor being configured to:
   acquire, from an accelerator sensor, a current amount of accelerator depression;
   calculate an amount of accelerator depression or a range of the amount of accelerator depression required for making a following distance between a preceding vehicle and an ego vehicle a predetermined target following distance, as a calculated depression amount or a range of the calculated depression amount, based on the following distance;
   display the current amount of accelerator depression and the calculated depression amount or the range of the calculated depression amount at a display device able to be viewed by a driver; and
   not change a display position of the display of the calculated depression amount or the range of the calculated depression amount, even if the following distance acquired through a camera or a distance measurement sensor changes and thus the calculated depression amount or the range of the calculated depression amount changes, to reduce frequency that the display position of the display of the calculated depression amount or the range of the calculated depression amount is changed.

2. The display control device according to claim 1, wherein the processor is configured, even if the following distance changes and thus the calculated depression amount or the range of the calculated depression amount changes, to change intervals between graduations positioned between the display of the current amount of accelerator depression and the display of the calculated depression amount or the range of the calculated depression amount, without changing the display position of the display of the calculated depression amount or the display of the range of the calculated depression amount.

3. The display control device according to claim 1, wherein the processor is configured to change the display position of the display of the calculated depression amount or the display of the range of the calculated depression amount where the following distance changes from any point of time and thus the calculated depression amount or the range of the calculated depression amount changes by equal to or greater than a reference value.

4. The display control device according to claim 3, wherein the processor is configured where an increase or decrease of speed of the preceding vehicle is predicted to be maintained over a predetermined time period, to change the display position of the display of the calculated depression amount or the range of the calculated depression amount, even if the calculated depression amount or the range of the calculated depression amount only changes by less than the reference value along with the change of the following distance.

5. The display control device according to claim 1, wherein the processor is configured, when the following distance changes and thus the calculated depression amount or the range of the calculated depression amount changes, to change the display position of the display of the calculated depression amount or the range of the calculated depression amount, where the calculated depression amount or the range of the calculated depression amount changes by equal to or greater than a predetermined reference amount per unit time.

6. The display control device according to claim 5, wherein the processor is configured, where an increase or decrease of speed of the preceding vehicle is predicted to be maintained over a predetermined time period, to change the display position of the display of the calculated depression amount or the display of the range of the calculated depression amount, even if the change per unit time of the calculated depression amount or the range of the calculated depression amount is less than the reference value.

* * * * *